US005790423A

United States Patent [19]

Lau et al.

[11] Patent Number: 5,790,423

[45] Date of Patent: Aug. 4, 1998

[54] INTERACTIVE AUDIO TRANSMISSION RECEIVING AND PLAYBACK SYSTEM

[75] Inventors: Edwin J. Lau, San Jose, Calif.; Donald R. Katz, Montclair, N.J.

[73] Assignee: Audible, Inc., Wayne, N.J.

[21] Appl. No.: 490,537

[22] Filed: Jun. 14, 1995

[51] Int. Cl.$^{6}$ .................... H04H 1/00; H04N 7/14

[52] U.S. Cl. .................... 364/514 R; 348/7; 348/10; 348/12; 455/4.2; 455/5.1; 455/6.3

[58] Field of Search .................... 348/7, 10, 12, 348/13; 455/4.2, 5.1, 6.2, 6.3, 3.1; 364/514; 358/335; 360/73.14, 72.3, 74.2, 132; 379/88, 89; 395/428; 369/60, 69, 75.1, 76, 272, 273, 274, 288

[56] References Cited

U.S. PATENT DOCUMENTS

| | | | |
|---|---|---|---|
| 3,763,330 | 10/1973 | Fulwiler | 360/94 |
| 4,266,243 | 5/1981 | Shutterly | 358/121 |
| 4,393,277 | 7/1983 | Besen et al. | 179/2 A |
| 4,455,651 | 5/1984 | Baran | 370/104 |
| 4,473,824 | 9/1984 | Claytor | 340/825.27 |
| 4,499,568 | 2/1985 | Gremillet | 369/30 |
| 4,682,368 | 7/1987 | Takahashi | 455/38 |
| 4,698,776 | 10/1987 | Shibata | 395/2.1 |
| 4,725,977 | 2/1988 | Izumi, et al. | 364/900 |
| 4,772,873 | 9/1988 | Duncan | 395/2.1 |
| 4,788,543 | 11/1988 | Rubin | 340/835.44 |
| 4,788,675 | 11/1988 | Jones et al. | 370/69.1 |
| 4,851,931 | 7/1989 | Parker et al. | 360/15 |
| 4,949,187 | 8/1990 | Cohen et al. | 348/10 |
| 4,989,179 | 1/1991 | Simko | 395/2.1 |
| 5,042,070 | 8/1991 | Linna et al. | 381/59 |
| 5,055,947 | 10/1991 | Satoh | 360/62 |

(List continued on next page.)

FOREIGN PATENT DOCUMENTS

| | | | |
|---|---|---|---|
| 0128093 | 5/1984 | European Pat. Off. | H04N 7/08 |
| 2651352 | 8/1989 | France | H04B 7/26 |
| 8704309 | 7/1987 | WIPO | H04B 7/00 |

OTHER PUBLICATIONS

Popular Mechanics, "Read Me A Story", Feb. 1995.
76 PC Today, PC Tomorrow "Be Listening Up", Jan. 1995.
44 Popular Science, Cable TV, "The Captive Audience Network", Feb. 1995.
Information Highway Media Corp., "Silicon Valley Start-up to Create New On-ramp . . . ", Nathan Schuhof, Inform. Highway Media Corp. or David Politis, Politis & Assoc. 3 pages.
Information Highway Media Corp., "Inform. Highway Corp. Retains Von Gehr Int'l As Investment Banker", Oct. 13, 1994, Nathan Schulof, Inform. Media Highway Corp. or Jim Kochman.
IEEE Communications Magazine, May 1994. "Interactive Video On Demand". Daniel Deloddere, Willem Verbiest, Henri VErhille.
IEEE Communications Magazine, May 1994. Baseband and Passband Transport Systems for Interactive Video Services. J. Richard Jones.

*Primary Examiner*—Douglas W. Olms
*Assistant Examiner*—Matthew C. Phillips
*Attorney, Agent, or Firm*—Blakely, Sokoloff, Taylor & Zafman

[57] ABSTRACT

The present invention includes a system for transmitting, receiving, storing and replaying a user selected program, which has a service center including an electronic user accessible interface and an electronically stored library of user selectable programs. It includes a base unit having an electronic interface that is electronically interconnectable with the service center's user interface to receive the user selected programs, and an output port that interconnects the base unit with a cassette.

The cassette includes a data input port for the reception of electronic data representing the selected programs from the base unit output port, and a memory storage to store the electronic data. The cassette is insertable into and interconnectable with electromechanical components of a standard magnetic tape audio cassette player whereby the stored program selections are transmitted from the cassette to the audio cassette player for broadcasting.

33 Claims, 3 Drawing Sheets

U.S. PATENT DOCUMENTS

| | | | |
|---|---|---|---|
| 5,065,258 | 11/1991 | Warren et al. | 360/15 |
| 5,099,422 | 3/1992 | Foresman, et al. | 364/401 |
| 5,132,992 | 7/1992 | Yurt | 375/122 |
| 5,159,182 | 10/1992 | Eisele | 235/492 |
| 5,172,413 | 12/1992 | Bradley et al. | 380/20 |
| 5,181,107 | 1/1993 | Rhoades | 358/86 |
| 5,191,410 | 3/1993 | McCalley et al. | 358/86 |
| 5,191,573 | 3/1993 | Hair | 369/84 |
| 5,210,611 | 5/1993 | Yee et al. | 358/191.1 |
| 5,247,347 | 9/1993 | Litteral et al. | 358/85 |
| 5,251,909 | 10/1993 | Reed et al. | 273/439 |
| 5,253,275 | 10/1993 | Yurt, et al. | 375/122 |
| 5,311,423 | 5/1994 | Clark | 364/401 |
| 5,359,698 | 10/1994 | Goldberg | 395/2.1 |
| 5,371,532 | 12/1994 | Gelman et al. | 348/7 |
| 5,383,112 | 1/1995 | Clark | 364/401 |
| 5,420,690 | 5/1995 | Koishi | 358/342 |
| 5,440,336 | 8/1995 | Buhro et al. | 348/13 |
| 5,491,774 | 2/1996 | Norris et al. | 395/2.79 |
| 5,511,000 | 4/1996 | Kaloi et al. | 364/514 A |
| 5,524,051 | 6/1996 | Ryan | 380/9 |
| 5,541,638 | 7/1996 | Story | 348/7 |
| 5,550,863 | 8/1996 | Yurt et al. | 375/240 |
| 5,557,541 | 9/1996 | Schulhof et al. | 364/514 |
| 5,572,442 | 11/1996 | Schulhof et al. | 364/514 C |
| 5,590,195 | 12/1996 | Ryan | 380/9 |
| 5,592,511 | 1/1997 | Schoen et al. | 375/220 |

INTERACTIVE AUDIO TRANSMISSION RECEIVING AND PLAYBACK SYSTEM

BACKGROUND OF THE INVENTION

1. Field of the Invention

The present invention relates generally to an audio transmission, receiving and playback system, and more specifically to a system in which a user may select specific audio recordings for transmission from a centralized library to a receiving unit at the user's location, and wherein the selected recordings are input into a digital memory resident in a portable cassette that is configured in size and functional components to be insertable and operable within a standard audio cassette playing device.

2. Description of the Prior Art

Recent technological advances in the compression of digital data and the expansion of storage capacities for miniaturized solid state devices together with the utilization of high speed modems and telephonic interconnections have created possibilities for personalized access to and usage of large amounts of data. In the field of interactive audio transmission, receiving and playback systems, a significant teaching is provided in U.S. Pat. No. 5,132,992 issued Jul. 21, 1992 to Yurt et al. This patent provides a basic teaching of a source library that is interconnected by transmission systems to a plurality of reception systems and ultimately user systems. The user received data may be stored for later usage by the user.

A drawback of Yurt et al. is that it does not address the most commonly owned user audio playback system, that being the audio cassette recorder/player. Such audio cassette recorders/players are found in home audio systems, automobile audio systems and portable cassette player devices. The present invention capitalizes upon this in place base of players by providing a cassette configured device having compressed digital storage features that is insertable within such existing cassette players for playback of audio selections that are compatible with the cassette players.

U.S. Pat. No. 5,195,182, issued Oct. 27, 1992 to Eisele and U.S. Pat. No. 5,055,947, issued Oct. 8, 1991 to Satoh describe audio cassette type devices having solid state memory capabilities. These devices are similar in some respects to Applicants' cassette described herebelow, however they lack certain significant features such as the compressed data input and/or storage, intercommunications with the audio cassette player function controls and the cassette interface logic and cassette program selection features.

SUMMARY OF THE INVENTION

The present invention includes a system for transmitting, receiving, storing and replaying a user selected program, which has a service center including an electronic user accessible interface and an electronically stored library of user selectable programs. It includes a base unit having an electronic interface that is electronically interconnectable with the service center's user interface to receive the user selected programs, and an output port that interconnects the base unit with a cassette.

The cassette includes a data input port for the reception of electronic data representing the selected programs from the base unit output port, and a memory storage to store the electronic data. The cassette is insertable into and interconnectable with electromechanical components of a standard magnetic tape audio cassette player whereby the stored program selections are transmitted from the cassette to the audio cassette player for broadcasting.

It is an advantage of the present invention that it provides a user with access to a large library of audio works in a digital format, and for the transmission, receipt, storage and later replay by a user in a standard audio cassette player.

It is another advantage of the present invention that it provides an intelligent audio cassette that permits a user to select the sequence in which digitally stored works will be replayed by the cassette.

It is a further advantage of the present invention that it provides a serial copy protection feature which prevents further digital duplication of audio works stored within the cassette.

It is yet another advantage of the present invention that it provides an intelligent audio cassette which interprets commands from a standard audio cassette player to skip forward or reverse in the outputting of stored audio works.

It is yet a further advantage of the present invention that it provides a technologically advanced microprocessor controlled digital storage device that is fully compatible with existing audio cassette players throughout the world.

These and other features and advantages of the present invention will become apparent to those skilled in the art upon further review of the detailed descriptions of the preferred embodiments set forth herebelow.

IN THE DRAWINGS

DETAILED DESCRIPTION OF THE PREFERRED EMBODIMENTS

Figure 1:
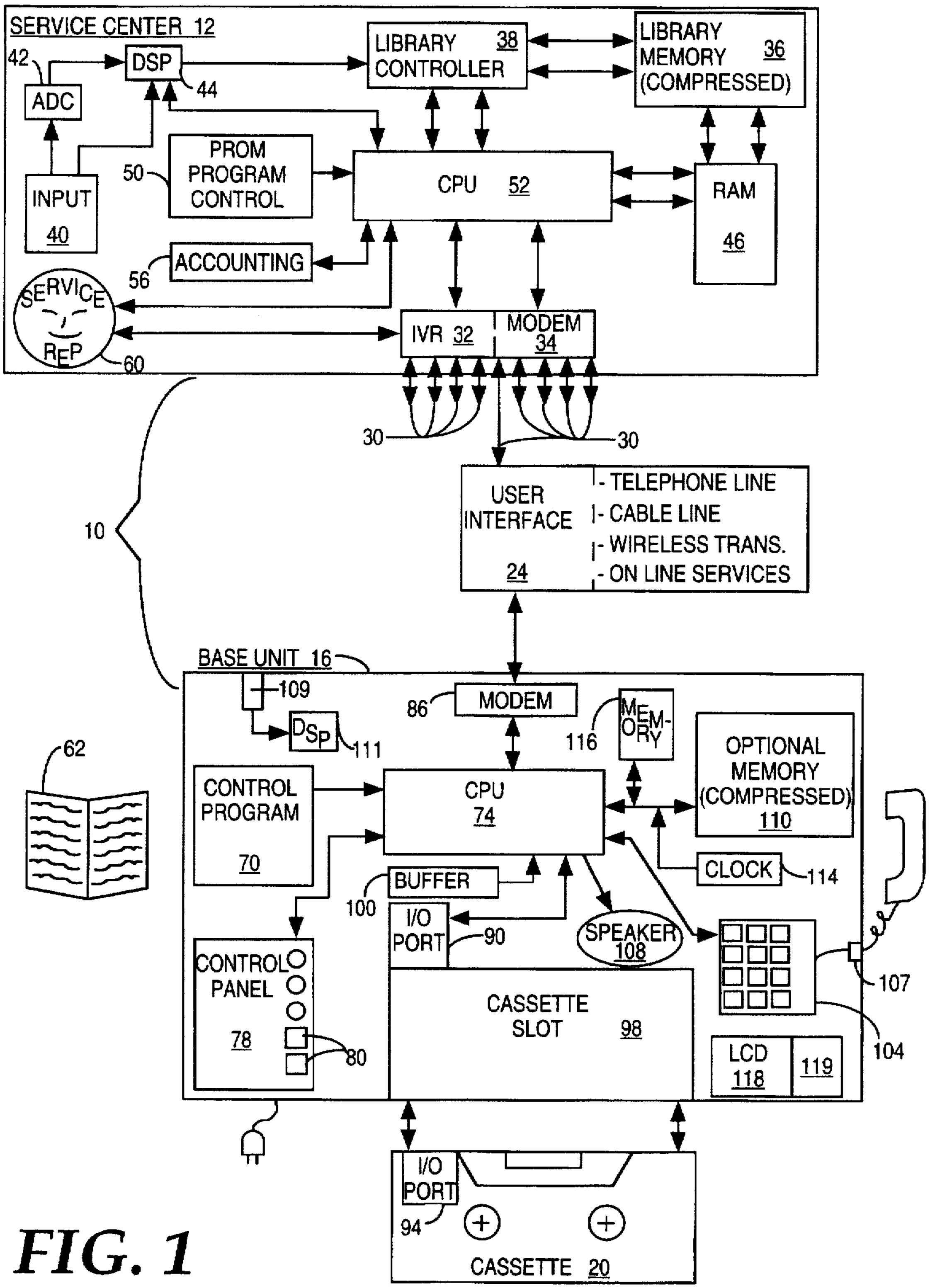
FIG. 1 is a schematic diagram of the service center, base unit and portable cassette portions of the present invention.

FIG. 1 presents a schematic diagram of the present invention 10. Generally, the invention 10 includes three basic components, a service center 12, a base unit 16 and a portable intelligent cassette 20. A user interface 24, which may take the form of a telephone line, a cable line, or wireless transmission, functions to communicate data between the service center 12 and the base unit 16. In an alternative embodiment, this interface communication can also be accomplished utilizing an on-line computerized service in association with a computerized form of the base unit, discussed herebelow. Each of the basic components is next discussed in detail.

The service center 12 functions as a centralized data repository that is accessed by a plurality of user interface lines 30 which communicate through an interactive voice response unit (IVR) 32. The IVR 32 includes a set of high speed modems or a high speed multiplex modem 34, that is capable of simultaneously handling calls and data requests from a plurality of users on lines 30. The service center 12 includes a large memory storage unit 36 in which is stored the library of addressable audio selections. In the preferred embodiment, the selections are stored in a compressed digital data format, which preserves memory space, and permits the storage of a large number of library selections with rapid outputting at the request of users. A library controller 38 which may include a data base program communicates with the library memory 36 to provide data addressing and input/output functions relative to various user selections of programs from the library 36. To add selections into the memory 36, a library input device 40, which may comprise a disk drive, a cassette player, a radio or television receiver, or other similar input device, is utilized. Signals from the library input device 40 may be in analog or digital format, and analog signals are first passed through an analog to digital converter ADC 42. The digital input signals from the ADC or digital input from the input device 40 are then passed through a digital signal processor 44 to compress the input digital signals, and the compressed digital signals are then transmitted to the library controller 38 for addressable storage within the library memory 36. A large random access memory RAM 46 is utilized for the temporary storage of user requested library selections when they are being outputted to users.

A serial copy management system SCMS may be programmed into the operating program for the digital signal processor 44. Such an SCMS consists of at least one flagged data bit in a specific bit location. When the bit value in the particular bit location is "1" it will be interpreted by a subsequent digital recording device to indicate that the digitized work associated with the flagged data bit is an original work. Original works are available for duplication by a digital recording device. Where the value of the flagged data bit is "0", a subsequent digital recording device will not record or duplicate the work associated with the "0" flag because the flag indicates that the work is a copy of an original work. The SCMS system therefore prevents the serial duplication of duplicated works. In the present invention, the DSP 44 is programmed to maintain a "1" in the appropriate bit location, indicating that the compressed digital data works in the library 36 are considered to be original works.

A preferred SCMS system consists of two flagged data bits wherein the first flag (a "0" or "1") indicates whether copyright protection exists for the particular work, and the second flag functions as described above to indicate whether the specific work is an original "1" or a duplicate "0". Where the first flag (copyright protection) indicates that no copyright protection exists for the work then the SCMS logic ignores the second flag regarding whether the work is an original or duplicate.

All automated functions of the service center 12 are controlled by a control program that is preferably stored in a RAM 50. Control program instructions from the RAM 50 are fed to a central processing unit CPU 52 which controls the flow of data and instructions within the service center. An accounting unit 56 utilizes data from the CPU 52 regarding individual users, their account numbers and their library selections to output automated billings to the individual users. In the preferred embodiment a human service representative 60 is provided to handle individualized service requests from users.

The basic operational features of the service center can now be described. Initially, individual library selections are addressably input to the library memory 36 by inputting uncompressed analog or digital input signals into an appropriate library input device 40. Under control of the CPU 52, the input materials are processed, converted from analog to digital if necessary in ADC 42, compressed in the digital signal processor 44 with the SCMS data bit set a "1", identifiably addressed through the library controller 38 and then stored in the library memory 36 in compressed digital format. Individual users may then contact the service center 12 through the plurality of interface lines 30 to the IVR 32. Individual users identify themselves by inputting preestablished account numbers and, upon account number recognition, one or more specific library addressable selections are requested by the user by inputting program selection numbers. A catalog 62 previously provided to each user contains program selection numbers for each library program. The CPU 52 receives the information from the IVR 32 and transmits the program selection numbers of the individual users to the library controller 38. The library controller 38 then addresses the library memory 36 to download the user requested programs to the RAM 46, through the CPU 52 to the IVR 32 which activates a high speed modem 34, whereupon the user identified programs are transmitted in compressed digital format through the user interface lines 30 to the particular user. Where many users are simultaneously requesting and receiving selections, the RAM 46 may be temporarily segmented to serve as a temporary storage buffer of the many selections until they are outputted.

Upon the completion of a data transmission transaction, the transaction data, including the user account information and the library programs selected are transmitted from the CPU to the accounting unit for the preparation of an appropriate billing. With an appropriate telephone input tone (such as #), a user calling on a transmission line 30 can be routed through the IVR 32 to a human service representative 60. The service representative 60 can access various components of the service center through the CPU 52, set up new accounts, respond to billing inquiries, and provide related services to individual users. It is therefore to be generally understood, that the service center 12 functions as an automated electronically accessible library to a plurality of users through the user interface lines 30, such that user selected programs are transmitted to a user in a digital compressed data format through the interface lines 30.

The base unit 16 is designed in a first embodiment for usage by an individual user; thus, the system 10 contemplates a plurality of base units, each possessed by an individual user and each being utilized at various times to communicate with the service center 12. The base unit 16 includes a prom or a flash memory 70 having a control program stored therewithin. The control program provides instructions to a CPU 74 which controls the flow of data and signals throughout the base unit 16. A user accessible control panel 78 is located on the surface of the base unit with appropriate function selection buttons 80 and status lights 82 to provide the user with information and selectable control of the various functions of the base unit 16. A suitable input/output device, such as a modem 86 is utilized to achieve the inputting and outputting of signals from the base unit 16, through the user interface 24 to the service center interface lines 30. A data input/output port 90 is interconnected through the CPU 74 to the modem 86, such that data received by the base unit 16 through the modem 86 may be passed to the input/output port 90. The input/output port 90 is designed for mating electrical interconnection with an input/output port 94 installed within the cassette 20. Thus, data transmitted from the modem 86 to the input/output port 90 will be further transmitted to the input/output port 94 of the cassette 20 when the cassette is engaged within a cassette holding slot 98 formed within the base unit 16. A data storage buffer 100 is associated with the CPU 74 to temporarily store data input from the service center to create data blocks for transmission to the input/output port 90. The base unit 16 also preferably includes a telephone keypad 104 having a telephone handset 106 engaged to an input jack 107, or speaker 108 associated therewith. The keypad 104 is utilized by the user to generate electrical signals (telephone tone signals) that are transmitted to the service center. Alternatively, the keypad 104 and handset 106 can be constituted as a standard touch tone telephone that is plugged into an input jack 107 that is connected to the CPU 74.

An augmented version of the base unit 16 may also include an auxiliary digital data input port 109 that is connected through a digital signal processor 111 to the CPU 74. This input port 109 is utilizable for receiving digital data from another source such as a compact disk player. The DSP 111 is utilized to compress the digital input data for processing by the CPU 74 in the same manner as the compressed digital data that is received through the modem 86.

In an augmented embodiment of the base unit 16, a memory storage device 110 may be interconnected to the CPU 74 within the base unit 16. Additionally, a clock 114 and a data tracking memory 116 associated with memory 110 may be utilized to provide replay control of the stored programs for copy protection purposes, as is discussed herebelow. Program data received by the modem 86 may then optionally be stored in the memory 110 in compressed digital format for later selectable downloading into one or more cassettes 20.

A serial copy management system (SCMS) may be additionally programmed within the base unit 16. The function of the SCMS programming in the base unit is to cause the CPU to read and detect the flagged data bit to determine whether the bit is a "0" or a "1". Where the flagged bit is a "1", the CPU 74 converts it to a "0", and where the CPU 74 detects a "0" bit the CPU is programmed to refuse to receive, store or transmit the work. Thus, the outputted compressed digital data from the base unit 16 to the cassette 20 will have the bit flag set a "0" indicating that the work inputted into the cassette is a copy and not available for further duplication. Where the base unit 16 includes the additional input jack 109 and DSP 111, the SCMS feature likewise checks to determine that the input work is an original ("1" in the appropriate data bit) and converts that "1" to a "0" upon outputting the compressed data representing the work to the cassette 20.

The operation of the base unit, in association with the service center, can now be described. Initially, each base unit 16 is identified with a specific serial number that is preprogrammed into the base unit. optionally, also preprogrammed into the base unit may be the telephone number(s) of the service center 12, and user activatable codes are programmed into the control program to allow the user to change or re-input the service center telephone number should the need arise. When the owner of a base unit plugs it into a home location telephone jack and contacts the service center for the first time, the base unit automatically identifies itself by outputting its serial number to the IVR 32 for verification. The IVR may also request the user to input a user identification code, which may consist of several alphanumeric characters for future identification purposes. Thereafter, the IVR requests the user through the speaker 108 or telephone handset 106 to input the user's telephone number utilizing the keypad 104. Whenever the base unit is activated in the future, it will automatically dial the service center and output the appropriate user identification information to the IVR automatically.

In commencing a particular transaction, the user will first identify, from a written catalog 62 or other source such as an on-line menu, a fax menu, a cable TV carried menu, a menu from the IVR 32 or a published menu, the particular program selection numbers associated with the audio programs which the user desires to obtain from the service center. The user places a cassette 20 within the slot 98 and turns on the base unit utilizing a control switch 80 on the control panel 78. The unit then electronically dials the telephone number of the service center and automatically provides the unit number and identification code for verification. The IVR 32 through control of the CPU 52 then requests the particular library program selection numbers from the user through the speaker 108 or the handset 106. The library selection numbers are then input by the user through the keypad 104, and following the complete inputting of the user's selection numbers the user is instructed to press a selection complete key, which may be the * on the keypad or a control switch 80. The requested library selections are then automatically located in memory 36 and downloaded from the service center 12, through the user interface 24 to the base unit 16.

In an augmented base unit embodiment, a liquid crystal display LCD 118 is utilized to display program selections for user verification as they are input by the user, and several selections can be pre-input by the user and stored in a memory 119 for rapid outputting upon command. The LCD 118 may also be utilized to provide a visual indication of the downloading process status, such as by displaying a percentage of selections downloaded from zero at the start to 100% when downloading is complete.

The incoming compressed digital data passes through the modem 86 and is read and routed by the CPU 74 through temporary storage in the buffer 100 to the input/output port 90, whereupon it is transmitted to a memory storage within the cassette 20 through the cassettes input/output port 94, as is discussed in detail herebelow. Alternatively, if the base unit includes an optional memory storage 110, as previously indicated, the incoming data through modem 86 can be routed by the CPU 74 into storage within the memory 110. When a base unit includes a memory 110, it is not necessary that a cassette 20 be installed within the cassette slot 98 in order for the base unit to properly function.

When the downloading of data from the service center is complete, the user interface connection is automatically terminated by the service center. The components of the cassette 20 are next described with the aid of FIG. 2.

Figure 2:
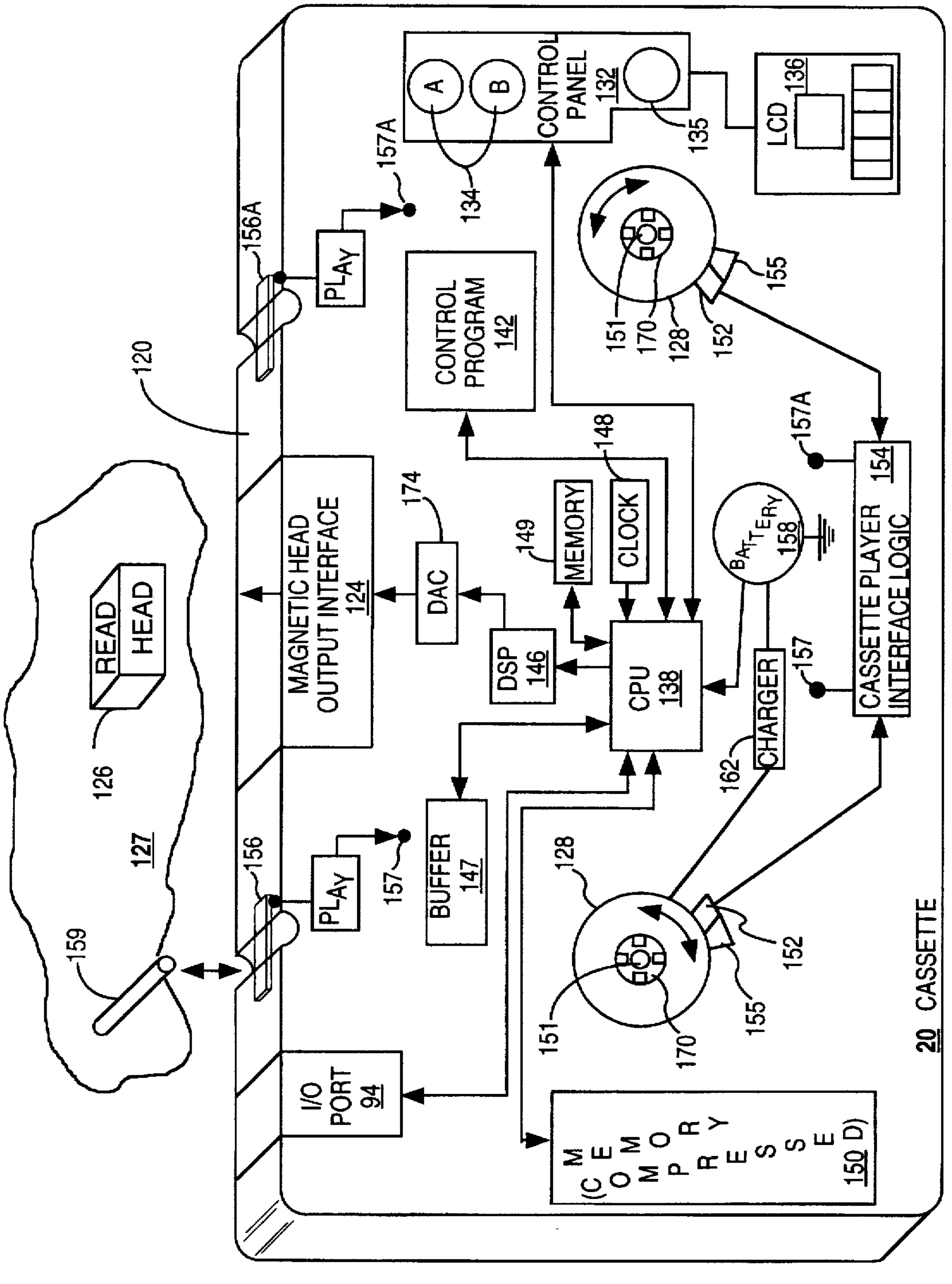
FIG. 2 is a detailed schematic diagram of the cassette portion of the present invention.

FIG. 2 is a schematic diagram depicting detailed features of the cassette 20. As indicated above, cassette 20 is formed in the size and shape of a standard audio cassette. It includes a forward edge 120 which contains a magnetic head output interface 124 that is centrally disposed along edge 120. The magnetic head output interface 124 is positioned to effectively communicate electronic data from the cassette 20 to the read heads 126 of a standard magnetic tape audio cassette player 127 when the cassette 20 is inserted into a cassette insertion slot of such a standard audio cassette player 127. Two rotatable spindle mechanisms 128 are disposed in the cassette 20 in the standard location for typical audio cassette tape reels, and the spindles 128 provide a communications interface between the audio cassette player 127 and the cassette 20, as is discussed in greater detail herebelow.

The preferred cassette 20 of the present invention also includes a control panel 132 having a plurality of user activatable switches or control buttons 134A and 134B which are formed in the outer surface of the cassette 20 for access by a user. The control panel 132 and associated control buttons 134 are formed relatively flush with the flat surface of the cassette 20, such that they will not interfere with the insertion of the cassette 20 into an audio cassette player in the normal course of usage.

A small speaker 135 and a liquid crystal display LCD 136 are also formed in the outer surface of the cassette 20 for providing program control information to the user. The speaker 135 provides audible "beeps" in response to the operation of the control buttons 134, such that a sight impaired user can utilize the control buttons effectively. The LCD 136 provides a display of the number of programs loaded into the cassette and the replay order of the programs, as determined by the user's utilization of the control buttons 134.

The cassette 20 includes a central processing unit CPU 138 that functions under the control of a control program stored in a prom or a flash memory 142. A digital signal processor DSP 146 is located within the cassette 20 to process digital data under the control of the CPU 138, and a flash memory 150 is utilized to store compressed digital data that is received by the intelligent cassette 20 through the input/output port 94. To facilitate the handling of data by the CPU 138, a memory storage buffer 147 is utilized by the CPU to temporarily store blocks of data for transmission to the memory 150. In an augmented embodiment of the cassette 20, a date and time clock 148 and a program play memory 149 are included in association with the CPU 138. The clock 148 and memory 149 are utilized to provide replay control of the stored programs for augmented copy protection purposes as is discussed herebelow.

The two spindles 128 include a rotation detection mechanism 152 that provides output signals to a cassette player interface logic 154 that indicates the direction of rotation, and speed of rotation of the spindles 128, when the spindles 128 are rotated by the drive mechanism 151 of an audio cassette player 127 (such as a forward, fast forward or reverse). In the preferred embodiment, the rotation detection mechanism 152 utilizes an electro-optical system which counts light pulses to determine rotation speed and direction. Alternatively, electromagnetic detectors may also be utilized with the caution that one of ordinary skill in the art would exercise when introducing magnetic fields in close proximity to memory devices. A spindle rotation braking mechanism 155 is mechanically engaged to the rotatable spindle 128 to brake the fast forward and reverse rotation of the spindle 128 after it has rotated a few revolutions at high speed. The braking mechanism 155 does not halt the "play" speed rotation of the spindle 128. The braking mechanism of the preferred embodiment employs a solenoid activated mechanical brake which is activated after the spindle has rotated approximately three turns. Alternative brake mechanisms 155 can include a centrifugal mechanism which is activated at the high rotation speed of forward and reverse but not activated at the relatively slower "play" RPM speed.

A capstan detection switch 156 is disposed in the forward edge 120 in electrical connection 157 with the cassette player interface logic 154 to provide an electrical signal when the cassette 20 is disposed within an audio cassette player and the audio cassette player's capstan 159 is deployed in the "play" position. Signals from the cassette player interface logic 154 are fed to the CPU 138 to control various playback features of the cassette 20 as is described in detail herebelow. It is possible for the user to insert the cassette 20 into a cassette player 127 in either an "up" position or a "down" position, and it is desirable that the cassette 20 function in either orientation. To achieve this interchangability of orientation, a second capstan detection switch mechanism 156A is located on the upper edge 120 in an opposite mirror location to the switch 156, such that if the cassette is inserted "upside down" the capstan 159 will be detected by switch 156A when it is deployed in the "play" position and an electrical signal through electrical connection 157A is sent to the cassette player interface logic 154.

A battery 158 is included within the cassette 20 to provide power for the CPU 138 and related cassette functions, and, in an alternative embodiment, a battery charger 162 may be incorporated within the cassette to provide trickle current power to recharge the battery 158 when the cassette spindles 128 are rotated. The operation of the cassette 20 in both storing data inputted from the service center 12 and through the base unit 16, and in playing back data within a standard audio cassette player 127 are next discussed.

Initially, a cassette 20 has been inserted within the cassette slot 98 of the base unit 16, such that the input/output port 94 of the cassette is electrically engaged with the input/output port 90 of the base unit. As discussed above, the base unit has been activated, established contact, and been verified by the service center, and the particular program selection numbers have been transmitted from the base unit to the service center, such that the base unit is now configured to receive the compressed digital data representing the selected programs from the service center. At this point, the CPU 74 in the base unit 16 waits for an interrupt from the service center modem 34 and the CPU 138 in the cassette 20 waits for an interrupt from the base unit input/output port 90. When the CPU 74 receives an interrupt from the modem 34 with a character, the character is read and placed into the buffer memory 100 within the base unit 16, and an input counter within the CPU 74 is incremented. The SCMS implementation is effected during this process when the CPU 74 detects and reads the appropriate bit flags to determine whether the flag bit is a "1" (original work suitable for recording) and the bit is changed to a "0", or the bit is a "0" (a previously duplicated work) whereupon the CPU 74 refuses to record or transmit the work. The input counter is checked at each input character to see if it has reached a block transfer size. If it has not, further characters are read and placed into the buffer 100 until the block transfer size is reached. When the block transfer size in buffer 100 has been reached, the CPU 74 begins a data transfer through the port 90, while it is still enabled to receive interrupts from the modem 34.

If the input/output port 94 of the cassette 20 has direct memory access DMA capability, the data block is transferred directly into the buffer memory 147 in the cassette 20. When the data block transfer is complete, the cassette CPU 138 begins a data transfer from the buffer memory 147 to the program memory 150, by first initializing the memory 150 for writing and then by writing the data block to memory 150 while still being enabled to receive data through the port 94.

If the port 94 does not have DMA capability, the CPU 138 receives an interrupt from the port 94 with a character. The character is read and placed into the buffer 147 and an input counter within the CPU 138 is incremented. The input counter is then checked to see if it has reached a block transfer size; if it has not, further characters are read into the buffer 147 until a block transfer size has been reached within the buffer 147. When the block transfer size has been reached, the CPU 138 begins the data transfer from the buffer 147 to the memory 150 as discussed above. After all of the selected data has been downloaded into the cassette memory 150, the data downloading is complete and the cassette may be removed from the base unit 16. Where the SCMS system has been implemented, each of the compressed digital works that are stored within the cassette 20 will have the associated bit flag set to "0" indicating that the work may not be further duplicated.

An analogous data processing system for cassette 20 is implementable utilizing alternative data control components. Specifically, an advanced digital signal processor 146 having CPU capabilities can be utilized in the cassette 20. In this embodiment the CPU 138 and DSP 146, as depicted in FIG. 2, are collapsed into a single component, effectively reducing the signal processing arrow 151 to a zero length.

Additionally, the buffer memory 147 can comprise a selected portion of memory 150 rather than a separate component 147. In this configuration the augmented DSP controls the data processing functions of both the CPU 138 and DSP 146 as shown in FIG. 2, and the addressed memory storage of buffer 147 is a predetermined portion of memory 150.

After data has been downloaded and stored, the cassette 20 is portable, and it may be inserted into any standard audio cassette player, whether a car stereo cassette player, or portable cassette player or a home stereo cassette player for replay of the programs that have been stored in the cassette memory 150.

Prior to inserting the cassette 20 into an audio cassette player, a user may utilize the control panel switches 134 to select the order in which a plurality of stored program selections will be replayed. A preferred selection method is to use switch 134A to step sequentially to each program stored in memory, and to use switch 134B to select a particular program.

To replay one or more of the programs stored in the memory 150, the cassette 20 is inserted into the cassette insertion slot of a standard audio cassette player. When the cassette 20 is inserted into an audio cassette player, the magnetic head output interface 124 is disposed in direct alignment with the read head 126 of the audio cassette player. Such read heads 126 are designed to receive a series of electromagnetic pulses that are resident within a surface coating on a magnetic tape. The magnetic head output interface 124 mimics the magnetic tape output characteristics, such that the read head 126 of the audio cassette player 127 receives and processes electromagnetic pulses from the interface 124 as though a standard audio cassette with a moving magnetic tape were providing the input to the read head 126. In a like manner, the tape drive mechanisms 151 of the audio cassette player 127 protrude into the tape drive spindle holes 170 of the cassette spindles 128, and the "play" capstan 159 of the cassette player contacts the capstan detection switch 156 when the player is in the "play" mode.

With some types of standard audio cassette players, when the cassette 20 is inserted into the audio cassette player playback does not immediately commence. To commence playing, a user typically must first press a "play" button on the audio cassette player 127, whereupon the play capstan 159 head is moved into contact with the magnetic tape of the cassette and the drive spindles of the cassette player commence to rotate. The cassette 20 detects the user's initiation of the play button of the audio cassette player by detecting the movement of the capstan 159 through the capstan detection switch 156 (or 156A), and a signal from the switch 156 (or 156A) is fed through connections 157 (or 157A) to the cassette player interface logic 154 which then feeds a commence data output signal to the CPU 138. In this manner, data output from the magnetic head output interface 124 of the cassette 20 commences when the user pushes the play button of the audio cassette player 127 or when cassette play is automatically started upon insertion of the cassette within certain types of audio cassette players.

When the play signal has been received by the CPU 138, the CPU 138 first determines the specific program that the user has selected to play first. The CPU 138 identifies the locations in memory 150 where the s elected audio program begins and ends. The CPU 138 then directs the copying of multiple data bloc ks from the memory 150 into the buffer memory 147. The CPU 138 then interrupts the DSP 146 and passes a list of the data bloc k addresses in the buffer memory 147 to the DSP. The DSP then begins to decompress the compressed digital signals from the buffer 147 representing the audio program and the outputs the decompressed digital signals to the DAC 174, which converts the decompressed digital signals to analog signals and transmits the analog signals to the inter face 124. The magnetic head output interface 124 then converts the analog signals into electromagnetic pulses that are transmitted to the read head 126 of the audio cassette player for processing, amplification and broadcast through the speaker system of the audio cassette player components.

When the DSP 146 has completed a data block, it marks it completed and interrupts the CPU 138 with a block complete message. The DSP then continues to decompress the compressed digital signals of the next data block within the buffer memory 147. When the CPU 138 receives an interrupt from the DSP 146 with a block complete message, the CPU checks to see if the entire program has been downloaded from the memory 150. If the entire program has not been downloaded, the CPU 138 copies the next data block into the previously completed data block storage address within the buffer 147. The downloading process continues until the entire selected program has been played.

When a first user identified program selection is completely downloaded from memory 150, the DSP 146 signals the CPU that the end address location has been reached. The CPU 138 then commences downloading the next user identified program selection in memory commencing at the starting memory address of the next selection. In this manner, all of the programs in the memory 150 are sequentially downloaded. The downloading of data from the memory 150 continues as long as the play switch 156 detects the capstan 159. When the switch 156 detects that capstan 159 has moved, the data output from the memory also ceases by action of the cassette player interface logic 154 and the CPU 138.

The preferred embodiment allows the user to control various playback features through the fast forward and reverse buttons of the audio cassette player 127. That is, when the fast forward or reverse buttons are depressed the tape drive mechanism 151 rotates rapidly in connection with the spindles 128, and the rapid rotation of the cassette spindles 128 will be detected through detectors 152 and be interpreted by the cassette player interface logic 154 as specific user commands. By way of example, pressing the reverse button once when detected by the cassette player interface logic 154, will be interpreted by the CPU 138 to cause the program selection being played to backspace for a fixed period of time, perhaps thirty seconds. This is accomplished by a command from the CPU 138 to the DSP 146 to change its playback address location to a previously played portion. Pressing the reverse button again within a short period of time, such as 10 seconds, is detectable by the cassette player interface logic 154 and interpreted by the CPU 138 to cause the DSP 146 to backspace (that is, select a previously addressed location) for a greater period of time than the first usage, perhaps five minutes. Pressing the reverse button a third time within perhaps 10 seconds results in the CPU 138 directing the DSP 146 to reset the program selection to the initial address location, thus starting the program selection from its beginning. Where the reset address is no longer in the buffer 147 the CPU 138 will direct the reloading of the correct program portions into the buffer 147 for rebroadcasting.

The spindle braking mechanism 155 serves to halt the rapid rotation of the spindle 128 as indicated above; because, unless the rapid spindle rotation is halted, most audio cassette player's tape drive mechanisms 151 will continue to rapidly rotate for an extended period of time. However, such audio cassette player tape drive mechanisms 151 are designed to cease rotational drive when the rotation of the spindle 128 is halted. Thus, the mechanical brake mechanism 155 is necessary to halt the spindle 128 rotation in order to detect multiple depressions of the reverse button (as well as fast forward button described next below).

Pressing the fast forward button once is similarly detected by the cassette player interface logic 154 and interpreted by the CPU 138 to cause the DSP addressing to skip forward for a fixed period of time; pressing the fast forward button twice is interpreted as skipping forward for a larger period of time, and pressing the fast forward button three times within perhaps 10 seconds causes the DSP to address the end location of the program, whereupon the CPU 138 will commence playing the next user identified selection. The spindle rotation detection mechanism can also be utilized as an alternative to the capstan detection switch 156 to determine when the audio cassette player is in the play mode. Specifically, when the spindle rotation detection mechanism 152 and cassette player interface logic 154 detect a spindle rotation within the RPM speed range of the standard "play" tape speed, this can be interpreted by the interface logic 154 as the play signal. The interface logic then indicates to the CPU 138 that the play command sequence should commence.

After a cassette 20 has been inserted into a cassette player 127, it is the "play" command (from switch 156 or 156A) through lines 157 or 157A to the logic 154 that is interpretable by the CPU 138 to determine whether the cassette has been inserted upside down or the reverse. This information is significant in the cassette's interpretation of the fast forward and reverse signals. That is, if a cassette 20 is inserted into a cassette player 127 and the fast forward or reverse buttons are first depressed on the cassette player, the cassette rotation detection mechanism 152 and interface logic 154 will detect the rapid rotation of the spindle 128, however it will not be determinable which button was depressed (fast forward or reverse). However, once the "play" rotation direction is known, the determination of fast forward or reverse is made. Therefore, a programming default command direction is preprogrammed into the control program stored in the memory device 142, such that it is initially assumed that the cassette is inserted into the cassette player in the standard "side A" cassette play direction.

Many of the program selections in the library will be copyrighted works, whereby the payment of royalties for the playing and replaying of the works is of concern, and the duplication of the works may be prohibited. The present invention as described in certain embodiments above enables a user to play and replay a program selection at will, and to duplicate and perhaps serially reduplicate a program selection at will also. Therefore, an augmented embodiment of the present invention includes a clock and a memory wherever the program selections are stored. In the cassette 20 the clock 148 and memory 149 serve this function, and in the augmented base unit embodiment having a memory 110, the clock 114 and memory 116 serve this function.

In an augmented embodiment which satisfies these copyright concerns, the clock 148 and/or 114 includes date and time information. The memory 149 and/or 116 is utilized to store the date and time that each particular program selection was downloaded into the cassette (or base unit), as well as each date and time that each individual program selection is played. Copyright protection criteria are programmed into the control program 142 to limit the usage of each selected program. For instance, a maximum time limit can be programmed, such that a stored program can only be accessed for a maximum of perhaps 30 days from its initial downloading into the memory storage 150, and/or 110. Thereafter, the CPU will not further access the address locations of the program, effectively erasing it from the memory. Similarly, the number of replays of each program selection can be limited, such that it can perhaps only be played two or three times, after which the CPU will refuse to address the storage locations of the particular program; thus effectively erasing the program from memory. Alternatively, the data stored in the memory 149 and/or 116 could be uploaded to the service center upon a subsequent usage of the cassette, thereby providing the service center with accurate information regarding the disposition of and number of replays of each individual selection. Furthermore, the maximum day limit and replay limit could be downloaded from the service center for each selected program as an alternative to being pre-programmed into the base unit or cassette memory.

Figure 3:
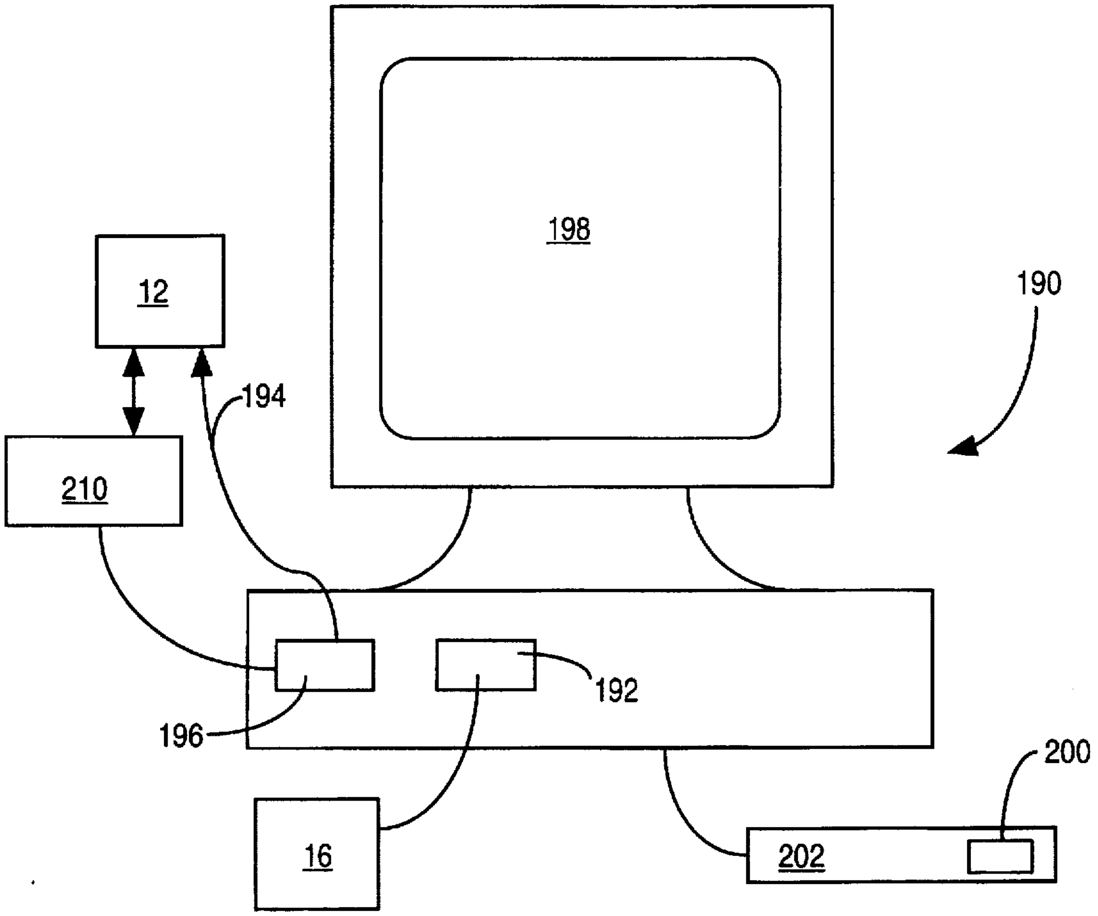
FIG. 3 is a diagram of personal computer based implementation of the present invention.

FIG. 3 depicts an alternative embodiment of the present invention utilizing a personal computer 190 as part of the user interface. In this embodiment, the base unit 16 is engaged to an input/output port 192 of a personal computer 190, and a user interface line 194 is connected to another input/output port 196 of the personal computer. In this augmented embodiment, the display screen 198 of the personal computer 190 provides augmented visual information to the user. For example, the personal computer display screen 198 can display the catalog selections previously described in terms of a written catalog 62. The keypad 200 located on the keyboard 202 of the personal computer can be utilized as the input keypad 104, whereupon the display screen 198 can display more information about the program selections to the user than can be provided by the LCD 118. The RAM memory in the personal computer can be utilized as the optional memory 110 described hereabove. It is contemplated that a personal computer embodiment as depicted in FIG. 3 can be configured as a publicly accessible station within a record store or a kiosk within a shopping center or other locations. Members of the public can bring or purchase blank cassettes 20 to the computer station 190 and create their own personalized cassettes with the particular selections that they wish to download into their cassette 20.

In a further augmented version of the present invention, the user interface 24 may take the form of a computerized online service 210, such as Internet, Compuserve or other user accessible multiple database network systems. In this embodiment, the service center 12 is interconnected with the online service 210, and the user's personal computer 190 is utilized to interconnect to the on-line service 210, thereby establishing a data transfer linkage between the service center 12 and the user's personal computer 190, whereby the user and his/her program selections can be transmitted to the service center 12 and the program selections can be downloaded to the user's base unit 16 through the on-line service network 210 and the personal computer 190.

While the present invention has been described with reference to certain preferred embodiments, the invention disclosed herewithin is not to be limited to such specific preferred embodiments. Rather, it is intended by the inventors that this application will cover all those other and alternative embodiments as would be known by those skilled in the art to be equivalent hereto. Therefore, the following claims are intended to cover all those devices that fall within the true spirit, scope and meaning of the claims and those equivalents thereto.

What I claim is:

1. A system for transmitting, receiving, storing and replaying a user selected program, comprising:

(a) a service center including:

i. an electronic user accessible interface;

ii. an electronically stored library of user selectable programs;

iii. an electronic control system functioning to receive a plurality of user program selections through said interface, and to select said program selections from said library, and to output said programs in the form of compressed electronic data through said interface;

(b) a base unit including:

i. an electronic interface being electronically interconnectable with said user accessible interface of said service center and functioning to receive said user selected programs;

ii. a base unit data interface port functioning to electronically interconnect said base unit with a cassette data interface port disposed on a cassette;

iii. a user activatable service center instruction device being electronically interconnected with said base unit and functioning to transmit user generated program selections through said electronic interface to said service center;

(c) a cassette including:

i. a cassette data interface port being electronically interconnectable with said base unit data interface port, for the reception of electronic data representing user selected programs into said cassette;

ii. a cassette electronic signal processing means being electronically connected with said cassette data interface port and functioning to process said electronic data;

iii. a memory storage means being interconnected with said signal processing means and functioning to store said compressed electronic data in memory locations that are addressable by said signal processing means said compressed electronic data includes bit values in specified bit locations that indicate whether the program selection represented by said compressed electronic data is an original work or a copy of an original work;

iv. a cassette function control means being interconnectable with mechanical components of an audio cassette player and functioning to detect movements of said mechanical components of said audio cassette player and to translate said movements into electronic cassette function controls;

v. a cassette electronic program data output means being electronically connected to said signal processing means and disposed to electronically interface with an input read head of said audio cassette player, whereby electronic signals representative of said stored program selections are transmitted by said data output means to said input read head for processing by said audio cassette player.

2. A system as described in claim 1 wherein the compressed electronic data is transmitted from said service center interface as an original work, and wherein the compressed electronic data is stored within said cassette as a copy of an original work.

3. A system as described in claim 1 wherein said electronic data is input and stored in said cassette in a compressed digital data format, and said cassette electronic signal processing means includes a digital signal processor to decompress said compressed digital data.

4. A system as described in claim 1 wherein said base unit further includes a second digital data input port for receiving digital data from a source other than said service center, and a digital signal processor is included within said base unit to electronically compress the digital data input through said second input port.

5. A system as described in claim 4 wherein said cassette function control means further includes an electronic data output control means functioning to receive said electronic rotation signals and to control the transmission output from said cassette through said output means.

6. A system as described in claim 1 wherein said base unit includes a memory storage device for storing compressed digital data from said service center interface for later user selectable outputting into a cassette.

7. A system as described in claim 1 wherein said service center instruction device includes a telephone keypad and a speaker and a microphone for voice communication between the user and said service center.

8. A system as described in claim 1 wherein said base unit further includes a visual display means functioning to provide visual information about the program data within said base unit to a viewer.

9. A system as described in claim 1 wherein said electronic data is input and stored in said cassette in a digital format, and transmitted from said cassette output means in an analog format.

10. A system as described in claim 1 wherein said cassette function control means includes at least one capstan detection means being engaged within said housing and functioning to detect the movement of a capstan of said audio cassette player as an indication of the play mode of said audio cassette player.

11. A system as described in claim 10 wherein two said capstan detection means are provided, said two capstan detection means being disposed in a forward edge of said cassette in an equal spaced-apart relationship relative to a centrally disposed cassette electronic program data output means.

12. A system as described in claim 1 wherein said cassette function control means includes a rotatable spindle means being engaged within said housing and being engagable with a rotating spindle drive component of said audio cassette player.

13. A system as described in claim 12 wherein said rotatable spindle means includes a rotatable portion which rotates in engagement with said spindle drive components of said audio cassette player, and a rotation detection means which detects the speed of rotation of said rotatable portion and provides electronic rotation signals indicative of said speed of rotation.

14. A system as described in claim 13 wherein said rotation detection means also detects the direction of rotation of said rotatable portion and provides electronic rotation signals indicative of said direction of rotation.

15. A system as described in claim 14 wherein said rotation detection means includes an electro-optical detector which detects pulses of light and which generates said electronic rotation signals based thereon.

16. A system as described in claim 12 wherein said rotatable spindle means includes a spindle rotation brake mechanism being disposed within said housing and functioning to halt the rotation of said rotatable portion.

17. A system as described in claim 16 wherein the activation of said brake mechanism is dependent upon the rotational speed of said rotatable portion.

18. A system as described in claim 17 wherein said brake mechanism is not activated when the rotational speed of said rotatable portion is in the play mode, but is activated when the rotational speed of said rotatable portion is in the fast forward and reverse mode.

19. A system as described in claim 18 wherein said brake mechanism includes an electrically activatable solenoid.

20. A system as described in claim 1, further including at least one user activatable control switch being disposed within said cassette housing and functioning to provide user program selection control of the transmitted output through said output means.

21. A portable electronic cassette for the storage and replay of electronic data, comprising:

a cassette housing having a size and shape for operative insertion within a standard audio cassette player device;

a data input port means being disposed within said housing and functioning to receive electronic signal data in a compressed digital data format;

an electronic signal processing means being electronically connected with said data input port means and functioning to process said electronic signal data, said electronic signal processing means includes a digital signal processor to decompress said electronic signal data received in a compressed digital data format;

a memory storage means being interconnected with said signal processing means and functioning to store said electronic signal data in a compressed digital data format in memory locations that are addressable by said signal processing means;

a cassette function control means being interconnectable with mechanical components of said audio cassette player and functioning to detect movements of said mechanical components of said audio cassette player and to create electronic cassette function control signals responsive to said movements;

a cassette electronic program data output means being electronically connected to said signal processing means and disposed to electronically interface with an input read head of said audio cassette player, whereby electronic signals representative of said stored program selections are transmitted in an analog format by said data output means to said input read head for processing by said audio cassette player.

22. An electronic cassette as described in claim 21 wherein said cassette function control means includes at least one capstan detection means being engaged within said housing and functioning to detect the movement of a capstan of said audio cassette player as an indication of the play mode of said audio cassette player.

23. An electronic cassette as described in claim 22 wherein two said capstan detection means are provided, said two capstan detection means being disposed in a forward edge of said cassette in an equal spaced-apart relationship relative to a centrally disposed cassette electronic program data output means.

24. An electronic cassette as described in claim 21 wherein said cassette function control means includes a rotatable spindle means being engaged within said housing and being engagable with a rotating spindle drive component of said audio cassette player.

25. An electronic cassette as described in claim 24 wherein said rotatable spindle means includes a rotatable portion which rotates in engagement with said spindle drive components of said audio cassette player, and a rotation detection means which detects the speed of rotation of said rotatable portion and provides electronic rotation signals indicative of said speed of rotation.

26. An electronic cassette as described in claim 25 wherein said rotation detection means also detects the direction of rotation of said rotatable portion and provides electronic rotation signals indicative of said direction of rotation.

27. An electronic cassette as described in claim 26 wherein said rotation detection means includes an electro-optical detector which detects pulses of light and which generates said electronic rotation signals based thereon.

28. An electronic cassette as described in claim 25 wherein said cassette function control means further includes an electronic data output control means functioning to receive said electronic rotation signals and to control the transmission output from said cassette through said output means.

29. An electronic cassette as described in claim 24 wherein said rotatable spindle means includes a spindle rotation brake mechanism being disposed within said housing and functioning to halt the rotation of said rotatable portion.

30. An electronic cassette as described in claim 29 wherein the activation of said brake mechanism is dependent upon the rotational speed of said rotatable portion.

31. An electronic cassette as described in claim 30 wherein said brake mechanism is not activated when the rotational speed of said rotatable portion is in the "play" mode, but is activated when the rotational speed of said rotatable portion is in the "fast forward" and "reverse" mode.

32. An electronic cassette as described in claim 31 wherein said brake mechanism includes an electrically activatable solenoid.

33. An electronic cassette as described in claim 21, further including at least one user activatable control switch being disposed within said housing and functioning to provide user program selection control of the transmitted output through said output means.

* * * * *

UNITED STATES PATENT AND TRADEMARK OFFICE
CERTIFICATE OF CORRECTION

PATENT NO. : 5,790,423
DATED : August 4, 1998
INVENTOR(S) : Lau et al.

It is certified that error appears in the above-identified patent and that said Letters Patent is hereby corrected as shown below:

In column 1 at line 64 delete "electromechanical" and insert --electro-mechanical--

In column 9 at line 63 delete "s elected" and insert --selected--

In column 9 at line 65 delete "bloc ks" and insert --blocks--

In column 9 at line 67 delete "bloc k" and insert --block--

In column 10 at line 6 delete "inter face" and insert --interface--

Signed and Sealed this

Eleventh Day of May, 1999

Attest:

Q. TODD DICKINSON

Attesting Officer

*Acting Commissioner of Patents and Trademarks*